Aug. 21, 1923.
C. C. FARMER
FLUID PRESSURE BRAKE
Filed Sept. 13, 1922
1,465,781
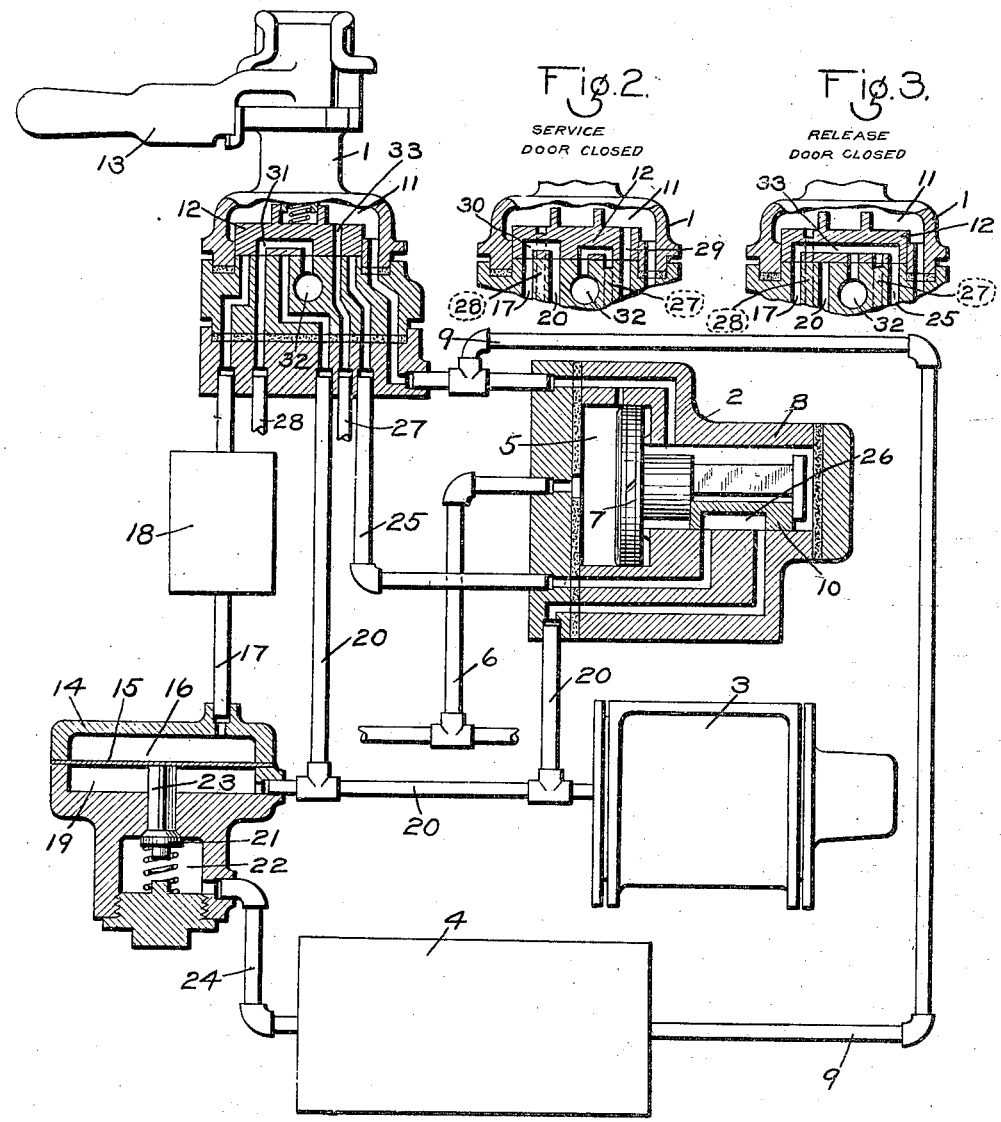
INVENTOR
CLYDE C. FARMER
BY Wm. M. Cady
ATTORNEY Patented Aug. 21, 1923.

1,465,781

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed September 13, 1922. Serial No. 587,902.

*To all whom it may concern:*

Be it known that I, CLYDE C. FARMER, a citizen of the United States, residing at Pittsburgh, in the county of Allegheny and State of Pennsylvania, have invented new and useful Improvements in Fluid-Pressure Brakes, of which the following is a specification.

This invention relates to an equipment for controlling the fluid pressure brakes and the car doors and is more particularly adapted for use in connection with electric traction cars.

The principal object of my invention is to provide an equipment for controlling the brakes and car doors and having means for maintaining the brake cylinder pressure in the car door open position.

In the accompanying drawing; Fig. 1 is a diagrammatic view, partly in section, of a car door and brake controlling equipment embodying my invention; Fig. 2 a sectional view of the brake valve device, showing the rotary valve in service application position with the doors closed; and Fig. 3 a sectional view of the brake valve device, showing the rotary valve in release position with the doors closed.

As shown in the drawing, the equipment may comprise a brake valve device 1, an emergency valve device 2, a brake cylinder 3, and a main reservoir 4.

The emergency valve device 2 may comprise a casing having a piston chamber 5 connected to an emergency brake pipe 6 and containing piston 7, and a valve chamber 8, connected by pipe 9 to the main reservoir 4 and containing slide valve 10 adapted to be operated by piston 7. The brake valve device 1 may comprise a casing having a valve chamber 11 connected by pipe 9 to the main reservoir 4 and containing a rotary slide valve 12 adapted to be operated by handle 13.

According to my invention, an additional valve device is provided comprising a casing 14 having a chamber containing a flexible diaphragm 15. The chamber 16 at one side of diaphragm 15 is connected to a pipe 17 leading to the seat of the rotary valve 12 and preferably the volume of the pipe 17 is enlarged by including a reservoir 18 therein. The chamber 19 at the opposite side of diaphragm 15 is connected to pipe 20 leading to the brake cylinder 3. A valve 21 contained in valve chamber 22 is provided with a stem 23 adapted to engage the diaphragm 15 and when the valve 21 is opened, connection is established from the main reservoir 4 to the brake cylinder 3, the main reservoir 4 being connected by pipe 24 to the valve chamber 22.

The usual straight air pipe 25 leads to the seat of rotary valve 12 and is connected in the release position of emergency slide valve 10, through cavity 26 with brake cylinder pipe 20.

A pipe 27, connected with the usual door engine, leads to the seat of rotary valve 12 and when fluid under pressure is supplied through said pipe to the door engine, said engine is operated to open the car door. Similarly, when fluid under pressure is supplied by the operation of the brake valve device 1 through a pipe 28 to the door engine, the engine is operated to close the car door.

In operation, when it is desired to apply the brakes in service, the brake valve handle is first turned to shift the rotary valve 12 to the position shown in Fig. 2. In this position, fluid under pressure is supplied through port 29 in the rotary valve to the straight air pipe 25 and thence flows through cavity 26 in the emergency slide valve 10 to the brake cylinder 20 and brake cylinder 3. In this position, the brake cylinder pipe 20 is connected through a cavity 30 with pipe 17, so that the diaphragm chamber 16 and the reservoir 18 are charged with fluid at the same pressure as supplied to the brake cylinder. When the desired pressure has been obtained in the brake cylinder 3 and it is desired to open the car door, the brake valve handle is turned to the position shown in Fig. 1. In this position, the door closing pipe 28 is connected through cavity 31 with an exhaust port 32, while the door opening pipe 27 is connected to a port 33, so that fluid under pressure is supplied to the door engine for operating same to open the car door.

The pipes 17 and 25 are blanked at the rotary valve 12 in this position and since the fluid under pressure in diaphragm chamber 16 is thus bottled up and remains at the pressure at which fluid was previously supplied to the brake cylinder, if any leakage from the brake cylinder 3 should occur, the pressure in diaphragm chamber 19 will be correspondingly reduced, so that the higher bottled up pressure acting in chamber 16 will operate diaphragm 15 to open valve 21 and thus admit fluid under pressure from the reservoir 4 to the brake cylinder. As soon as the brake cylinder pressure has been restored, the pressures on opposite sides of the diaphragm 15 being equalized, the valve 21 will close, cutting off the further supply of fluid to the brake cylinder.

The brakes may be released by turning the brake valve handle to release position, in which, as shown in Fig. 3, the straight air pipe 25 as well as pipe 17 is connected to exhaust port 32 through cavity 33, so that the maintaining valve device is cut out of action by the release of fluid pressure from chamber 16.

Having now described my invention, what I claim as new and desire to secure by Letters Patent, is:—

1. The combination with a brake cylinder, and a brake valve device having ports for controlling a car door and a service application position in which the car door is held closed and another position in which the car door is opened, of a brake cylinder pressure maintaining device operating according to the pressure of fluid supplied to the brake cylinder in the service application position of the brake valve device for maintaining the brake cylinder pressure in the door open position of the brake valve device.

2. The combination with a brake cylinder and a brake valve device having ports for controlling the opening and closing of a car door and having a service position in which fluid under pressure is supplied to the brake cylinder and the car door is held closed and another position in which fluid pressure is supplied for opening the car door, of a brake cylinder maintaining valve device having a diaphragm with one side constantly connected to the brake cylinder and the other side connected to the brake cylinder only in the service position of the brake valve and a valve operated by said diaphragm for supplying fluid to the brake cylinder.

3. The combination with a brake cylinder and a brake valve device having ports for controlling the fluid pressure for operating a car door and having one position in which the brakes are applied and the car door held closed and another position in which the brakes are held applied and the car door is opened, of means for maintaining the pressure in the brake cylinder in the door open position at the pressure supplied to the brake cylinder in the door closed position of the brake valve device.

In testimony whereof I have hereunto set my hand.

CLYDE C. FARMER.